O. A. HOLLIS.
PROCESS OF MAKING AND PILING CONCRETE STRUCTURES.
APPLICATION FILED JUNE 3, 1913.
1,175,356.
Patented Mar. 14, 1916.
2 SHEETS—SHEET 1.
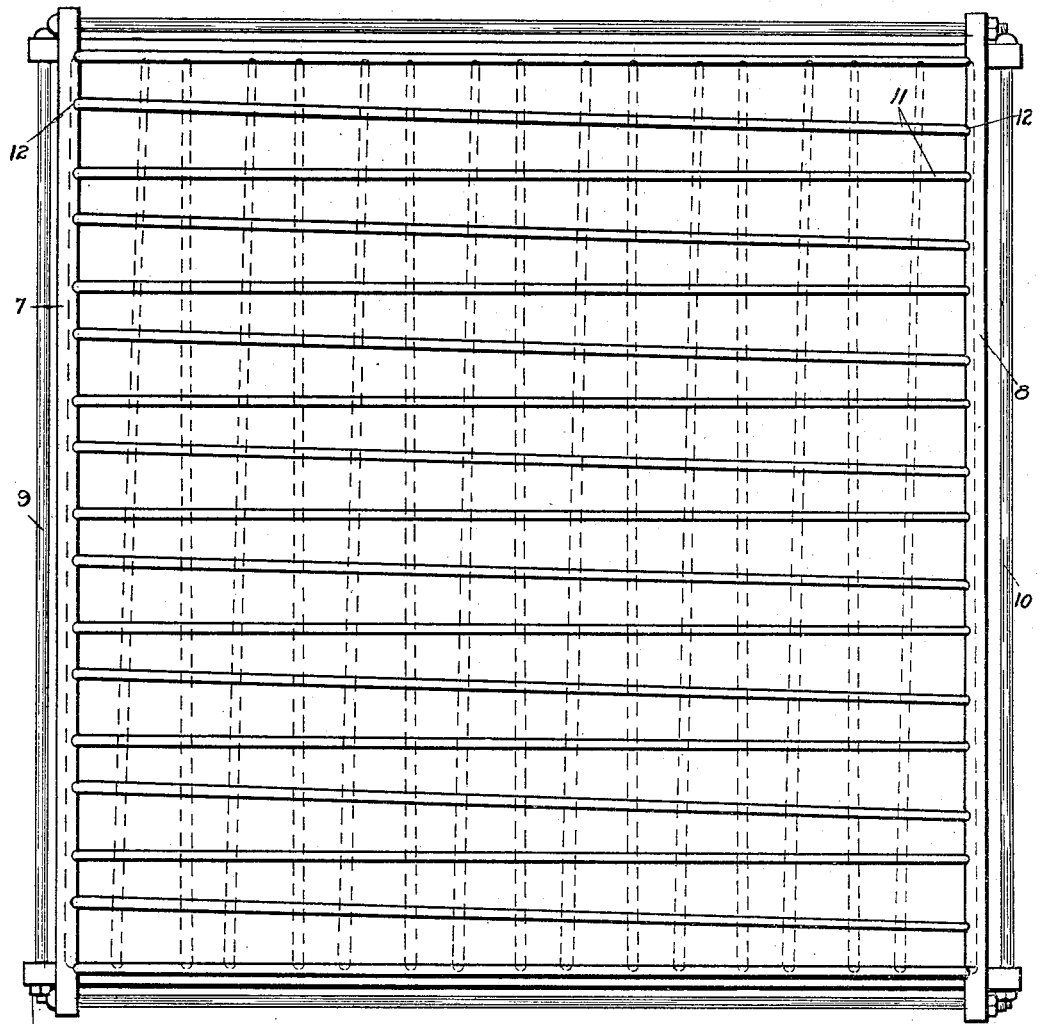
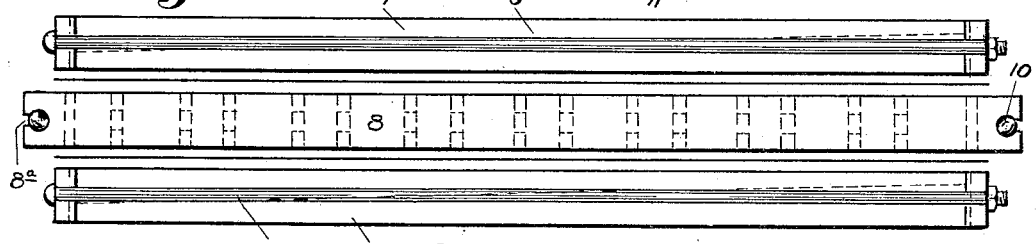

O. A. HOLLIS.
PROCESS OF MAKING AND PILING CONCRETE STRUCTURES.
APPLICATION FILED JUNE 3, 1913.
1,175,356.
Patented Mar. 14, 1916.
2 SHEETS—SHEET 2.
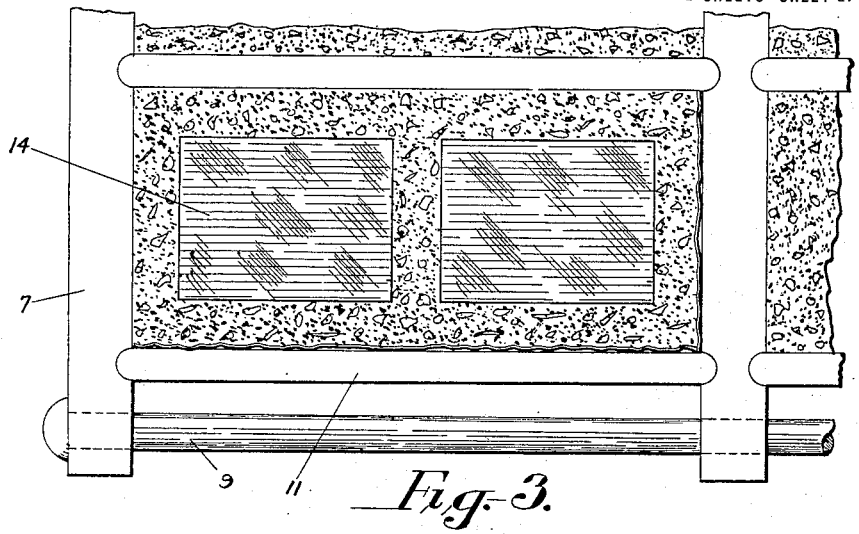
Fig-3.
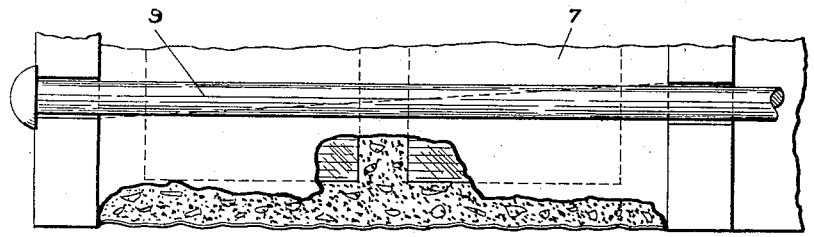
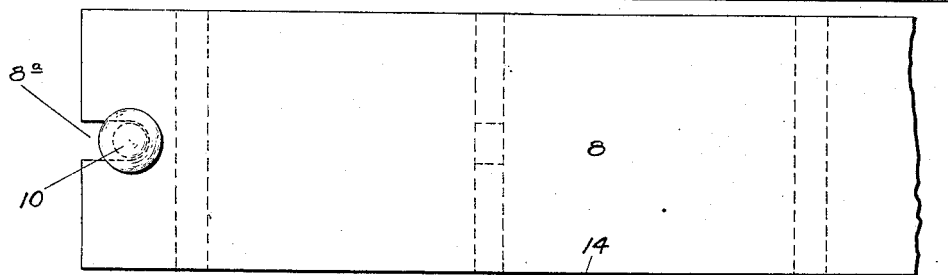
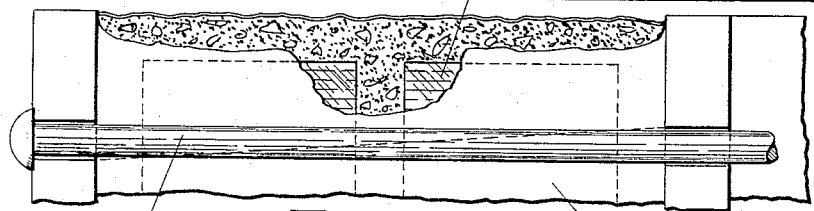
Fig-4.
WITNESSES.
INVENTOR.
Atty.

UNITED STATES PATENT OFFICE.

OTIS A. HOLLIS, OF PITTSBURGH, PENNSYLVANIA.

PROCESS OF MAKING AND PILING CONCRETE STRUCTURES.

1,175,356.  Specification of Letters Patent.  Patented Mar. 14, 1916.

Application filed June 3, 1913. Serial No. 771,443.

*To all whom it may concern:*

Be it known that I, OTIS A. HOLLIS, a citizen of the United States, residing at Pittsburgh, in the State of Pennsylvania, have invented a certain new and useful Process of Making and Piling Concrete Structures, of which the following is a specification.

My invention relates to mold structures of plastic material and its primary object is to simultaneously make and pile a series of molded articles such as concrete posts, which objects I accomplish by the form and manipulation of the mold. Briefly, the articles are made in a mold of such form that they may be made in multiple series and in place piled for curing in storage and the parts of the mold may be removed after the plastic material is set, leaving the articles with air spaces between them for efficient drying and requiring no further handling until ready to ship to market.

I have illustrated the invention in several forms in the accompanying drawings wherein—

Figure 1 is a plan view of a pile of molded fence posts of concrete with the parts of the mold thereon and Fig. 2 is a side elevation of the same at the stage when there are three tiers of posts. Fig. 2ª shows an improved form of the parting members. Figs. 3 and 4 are similar views of the mold adapted to make hollow tile or building blocks, showing the core in place.

Heretofore, it has been the custom to mold concrete articles and immediately upon setting, take down the mold and remove each article separately, storing them by hand operations, whereupon the mold is re-assembled and the process repeated. This involves handling the concrete when in delicate condition causing a great deal of breakage, prevents any extended multiple work, and is otherwise expensive on account of the large floor space required and the amount of handling, etc.

In my process the articles are molded in multiple directly in the place and in the form in which they are to be piled or stocked for storage and curing and drying, the mold being so formed as to be removable without disturbing the molded article.

Thus in Fig. 1, I provide two mold sides 7 and 8, held together by bolts or rods 9 and 10 and separated into mold sections by a series of parting boards 11, which are preferably rounded at their ends and fit in rounded vertical slots 12 in the boards 7 and 8 and are tapered in form from end to end. The parting board is preferably also made in two parts of wedge form as shown in Fig. 2ª, for easy withdrawal. Preferably the parting boards have their wider ends at the same side of the mold. The board 7, 8, being placed on a flat surface on top of a sheet of tarred paper, for example, and the side boards 7, 8, properly adjusted in size, the parting boards 11 are preferably thoroughly wet in order to swell them and then are dropped into the slots 12. Thereupon the concrete is filled in the spaces for the posts 13 and tamped until their tops are exactly flush with the side boards 7, 8, and the parting boards 11. This structure is then covered with another sheet of tarred paper and a second frame just exactly like the one described above it placed on the top of the tarred paper with the running boards at right angles to those of the first set and the process repeated. When a sufficient number of posts has thus been molded, and the concrete has set, the parting boards 11 will have dried out somewhat and thereby contract in size and become loose in place. The side boards 7 and 8 are removed by loosening the nuts 9ª if necessary, withdrawing the bolts 9 and 10 through the slotted ends 8ª of the side-boards, whereupon the parting boards 11 may be withdrawn from between the molded posts. The posts thus are left piled in place and held in proper alinement and arranged for free circulation of air and require no handling whatever. Of course, strengthening metal may be placed in the mold in the usual way when desired and any other cores may be used as in the customary molding process.

In Figs. 3 and 4, I have shown a series of molds for hollow building tile or building blocks of concrete, the mold structure being substantially as before described with the exception that I employ cores of wet clay 14, which, upon drying will fall away and drop out of the cavity when the blocks are to be removed for shipment. The process is, with this exception, the same as before described.

In addition to the wetting of the parting boards for subsequent shrinkage, and their formation in wedge shape for easy withdrawal, I may make further provisions for facilitating withdrawal by placing sheets of paper against their sides in the same way as on the top and bottom of a layer of articles. It will be understood that the same process is employed for any number of articles that are to be stacked and have plain sides so as to enable withdrawal of the parting boards.

The advantages of my invention flow from the economy in space, the ease of handling, the simplicity of the mold,—employing one layer of articles as the top and bottom of the contiguous molds—and especially I avoid the time and expense in breakage necessarily involved in handling concrete structures. Other advantages of the process will readily occur to those familiar with the art.

Having thus described my invention and illustrated its use, what I claim is the following:

The process of simultaneously making and storing a number of articles of concrete which consists in molding the articles in a separable mold whose parts are of the same height as the article, covering the top of the first mold with a separating medium, building above said separating medium a mold similar to the first mold cross-wise thereof, filling therein a new series of the articles, and so on indefinitely, allowing the material to set, and then withdrawing the mold parts whereby to leave spaces throughout the pile of articles for circulation of air therethrough, substantially as described.

In testimony whereof I have hereunto signed my name in the presence of the two subscribed witnesses.

OTIS A. HOLLIS.

Witnesses:
   Jo. BAILEY BROWN,
   FRED'K STAUB.

Copies of this patent may be obtained for five cents each, by addressing the "Commissioner of Patents, Washington, D. C."